UNITED STATES PATENT OFFICE.

JAMES E. LAPPEN, OF WINONA, MINNESOTA, ASSIGNOR TO UNION FIBRE COMPANY, OF WINONA, MINNESOTA, A CORPORATION OF MINNESOTA.

INSULATING-BOARD AND METHOD OF PRODUCING THE SAME.

1,169,079.  Specification of Letters Patent.  Patented Jan. 18, 1916.

No Drawing.  Application filed May 15, 1913.  Serial No. 767,857.

*To all whom it may concern:*

Be it known that I, JAMES E. LAPPEN, a citizen of the United States, residing at Winona, in the county of Winona and State of Minnesota, have invented certain new and useful Improvements in Insulating-Boards and Methods of Producing the Same, of which the following is a specification.

My invention relates to improvements in insulating boards and the method of producing the same, its object being to provide an improved heat and sound insulating material which can be formed into self sustaining boards or slabs capable of retaining the shape initially given them, which shall be fire resisting and water repellent, which will not itself become discolored nor discolor plaster or other substances it may come in contact with, and which shall be cheap and easy to make.

The material produced by the present invention is, broadly speaking, a composition of mineral wool and vegetable fiber with other ingredients. As heretofore made such compositions have been composed of mineral wool, de-gummed flax fiber, and a binder of paper stock or of the gums naturally present in the flax. But paper stock is too expensive, and the natural gums of the flax become discolored and discolor the plaster laid against the board.

In carrying out the invention I take about three thousand pounds of flax straw and six hundred to nine hundred pounds of some vegetable substance like wheat, oats, or rye straw which has a very short fiber, and no pecto-cellulose, and cook the same in an alkali solution to de-gum the flax straw and soften the vegetable tissue. The proportions of these ingredients can be varied within wide limits but I have obtained the best results by using them in about the proportions stated. I then take about five hundred pounds of this stock, wash it thoroughly to wash away all gummy matter coming from or adhering to the flax, and beat it in water in an ordinary paper mill beater to about the consistency of half stock, that is, until the short-fibered straw has been partially pulped. I then beat it to about the boiling point, add about forty pounds of petroleum tailings (wax from crude oil), and twenty pounds of crude paraffin wax, and agitate the mixture by beating or otherwise so as to mix the ingredients and distribute the now melted petroleum tailings and paraffin wax throughout the stock. I then add about five hundred pounds of mineral wool and beat it up with the other ingredients until it becomes thoroughly mixed therewith. I then add from seven to ten pounds of alum in order to set the tailings and paraffin wax to the vegetable stock and the wool fibers, and agitate the mixture. The product can then be molded into boards or slabs of any desired shape or size. The boards are then put into a kiln to dry out the moisture.

The product thus made will have high heat and sound insulating properties, because of the retention of the flax shives, which make air cells, while the wheat, oats, or rye straw acts as a filler and binder. This straw is so much softer than the flax that it will be beaten up into a mushy or pulpy state while the flax shives, being hard, and the flax fiber, being tough, will hold their natural form. The mushy straw serves partially to seal the ends of the tubular flax fibers, and thus increase the waterproof character of the product; it also binds the materials together so as to make a harder and stronger board, and holds the petroleum tailings and wax from running out with the water in molding, because these substances adhere more readily to the straw than to the flax shives and fibers and the mineral wool.

The mineral wool forms the skeleton or structural framework of the product and serves to keep the vegetable fibers and tissues apart, so that the mass will not sag when the water drains out, but will stand up to the thickness at which it comes out of the mold. It is essential that the finished board should be uniform in thickness for it is meant to be used upon walls like boards. The mineral wool also serves to make the board fire resisting.

The petroleum tailings and paraffin wax serve not only as a waterproofing agent but as a binder and stiffener, for being mixed with the stock in heated and melted condition they permeate the fibrous mass, and then when the product is cooled and dried, they will congeal again and give stiffness and hardness to the same.

While I find that the best results are obtained by using the ingredients in the proportions given in the specification, I wish it understood that these proportions can be varied somewhat without materially altering the nature of the process or the character of the product produced.

I claim as my invention:

1. The method of producing insulating boards which consists in mixing melted petroleum tailings, paraffin wax, mineral wool, and alum with a watery stock of de-gummed flax fibers and shives and a partially pulped short-fibered vegetable straw, and then forming the product into boards.

2. The method of producing insulating boards which consists in first forming a watery stock of de-gummed flax fibers and shives and a partially pulped short-fibered vegetable straw reduced to a mushy condition, then mixing the same with melted petroleum tailings and paraffin wax, and then adding mineral wool and beating the mixture, then adding alum and forming the product into boards.

3. The method of producing insulating boards which consists in first forming a stock of de-gummed flax fibers and shives and softened short-fibered vegetable straw and washing the same, then beating the stock in water to about the consistency of half stock, then mixing petroleum tailings and paraffin wax therewith, then adding mineral wool and beating it up with the other ingredients, then adding alum and agitating the mixture, and forming the product into boards.

4. The method of producing insulating boards which consists in first forming a stock of de-gummed flax fibers and shives and a softened short-fibered vegetable straw, then mixing about five hundred pounds of this stock in water with about forty pounds of melted petroleum tailings, twenty pounds of crude paraffin wax, five hundred pounds of mineral wool and about seven pounds of alum, and then forming the product into boards.

5. The method of producing insulating boards which consists in first forming a watery stock of de-gummed flax fibers and shives and a softened short-fibered vegetable straw and washing the same, and then mixing the stock in water with an equal amount of mineral wool and sufficient melted petroleum tailings and paraffin wax to impregnate the mass, then adding alum and finally forming the product into boards.

6. The method of producing insulating boards which consists in first forming a stock containing a major amount of de-gummed flax fiber and shives and a minor amount of softened short-fibered vegetable straw, then mixing this stock in water with approximately an equal amount of mineral wool and a smaller amount of melted petroleum tailings, paraffin wax, and alum, and then forming the product into boards.

7. An insulating board consisting of de-gummed flax fibers and shives and short-fibered straw intimately associated, mineral wool mixed with said intimately associated fibers, shives and straw, and petroleum tailings and paraffin-wax impregnating and stiffening the self-sustaining body formed by the fibers, shives, straw and mineral wool.

8. As a new article of manufacture, a self-sustaining water repellent insulating board consisting of a stock containing a major amount of de-gummed flax fibers and shives and a minor amount of broken short-fibered vegetable straw, intimately intermingled with mineral wool and alum, the whole mass being impregnated with and stiffened by petroleum tailings and paraffin wax.

In testimony whereof I affix my signature in presence of two witnesses.

JAMES E. LAPPEN.

Witnesses:
ARTHUR P. LOTHROP,
H. SWANSON.